United States Patent
Ford et al.

(10) Patent No.: US 7,334,258 B1
(45) Date of Patent: Feb. 19, 2008

(54) CONFIGURATION FILE DOWNLOAD ENFORCEMENT

(75) Inventors: Alan Ford, Chatswood (AU); Gregory Mintel, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 782 days.

(21) Appl. No.: 10/268,338

(22) Filed: Oct. 9, 2002

(51) Int. Cl.
*H04L 9/32* (2006.01)

(52) U.S. Cl. .................... 726/4; 726/26; 713/1
(58) Field of Classification Search ............... 713/1; 726/4
See application file for complete search history.

(56) References Cited

U.S. PATENT DOCUMENTS

| | | | | |
|---|---|---|---|---|
| 5,455,865 | A * | 10/1995 | Perlman | 713/153 |
| 5,457,746 | A * | 10/1995 | Dolphin | 705/51 |
| 5,499,294 | A * | 3/1996 | Friedman | 713/179 |
| 6,070,246 | A * | 5/2000 | Beser | 726/2 |
| 6,170,061 | B1 * | 1/2001 | Beser | 726/3 |
| 6,317,162 | B1 * | 11/2001 | Matsumoto | 348/553 |
| 2001/0051996 | A1 * | 12/2001 | Cooper et al. | 709/217 |
| 2002/0138757 | A1 * | 9/2002 | Lynn et al. | 713/201 |

OTHER PUBLICATIONS

Stallings, William; Cryptography and Network Security, 2nd edition; Prentice Hall, Inc.; 1998; Chapter 10.*
Pfleeger, Charles P.; Security in Computing; Prentice Hall, Inc.; 1989; Chapter 4.*
Minasi et al. Mastering TCP/IP for NT server; Sybex; 1997; Chapters 8 and 13.*
Data-Over-Cable Service Interface Specifications, *Radio Frequency Interface Specification*, SP-RF1v1.1-109-020830, © Copyright 1999-2002 Cable Television Laboratories, Inc. All rights reserved.
QoS Profile Enforcement for the Cisco uBR7200 Series Router, http://www.cisco.com/univercd/cc/td/doc/product/software/ios120/120newft/120t/120t4/qosprl:, pp. 1-5, Posted: Thu, Jan. 16, 23:24:48 PST 2003, All Contents are Copyright © 1992-2002 Cisco Systems, Inc., All rights reserved.

* cited by examiner

*Primary Examiner*—Gilberto Barrón, Jr.
*Assistant Examiner*—Jung Kim
(74) *Attorney, Agent, or Firm*—Beyer Weaver LLP

(57) ABSTRACT

Methods and devices are provided for detecting or preventing unauthorized upgrades to a customer's quality of service in an access data network. Several aspects of the invention require customer nodes to properly perform an initialization procedure. For example, the initialization procedure may involve making a request to a server controlled by, or at least trusted by, the service provider. The initialization procedure may involve downloading a configuration file, such as a DOCSIS configuration file, from the trusted server. According to some such aspects of the invention, nodes that cannot properly perform the initialization procedure are prevented from coming online. According to other such aspects of the invention, nodes that cannot properly perform the initialization procedure are marked. A warning may be sent to marked nodes. A customer associated with a marked node may be charged a higher rate for service.

33 Claims, 9 Drawing Sheets show cable modem

| Interface | Prim sid | Online State | Timing Offset | Rec Power | QoS | CPE | IP address | MAC address |
|---|---|---|---|---|---|---|---|---|
| Cable4/0/U1 | 1 | online(pt) | 2733 | 0.50 | 5 | 0 | 10.1.1.38 | 0002.fdfa.0a35 |
| Cable4/0/U1 | 2 | online(pt) | 2736 | 0.50 | 5 | 1 | 10.1.1.53 | 0030.96f9.6605 |
| Cable4/0/U0 | 3 | online(pt) | 2217 | -0.75 | 5 | 1 | 10.1.1.46 | 0050.7366.2223 |
| Cable4/0/U1 | 4 | online(pt) | 2737 | 0.00 | 5 | 0 | 10.1.1.51 | 0030.96f9.65d9 |
| Cable4/0/U1 | 5 | #online(pt) | 2214 | 0.25 | 8 | 2 | 10.1.1.47 | 00ff.ff66.12fb |
| Cable4/0/U0 | 6 | online(pt) | 2734 | 0.00 | 5 | 0 | 10.1.1.48 | 0007.0e03.307d |
| Cable4/0/U0 | 7 | online(pt) | 2730 | 0.25 | 5 | 1 | 10.1.1.50 | 0090.9607.382f |
| Cable4/0/U0 | 8 | online(pt) | 2738 | 0.25 | 5 | 0 | 10.1.1.34 | 0001.9659.4477 |
| Cable4/0/U1 | 9 | online(pt) | 2740 | 0.25 | 5 | 1 | 10.1.1.32 | 0001.9659.43fd |
| Cable4/0/U1 | 10 | online(pt) | 2739 | 0.25 | 5 | 1 | 10.1.1.36 | 0001.9659.4447 |
| Cable4/0/U1 | 11 | online(pt) | 2731 | 0.50 | 5 | 0 | 10.1.1.35 | 0090.9607.3831 |
| Cable4/0/U1 | 12 | online(pt) | 2726 | 0.25 | 5 | 1 | 10.1.1.40 | 0020.4089.7ed6 |

Fig. 2A

CONFIGURATION FILE DOWNLOAD ENFORCEMENT

BACKGROUND OF THE INVENTION

1. Field of the Invention

The present invention generally relates to access data networks that use at least one shared access communication channel to communicate between a plurality of nodes in the network and a terminal to which the plurality of nodes is connected. More specifically, the present invention provides methods and devices for detecting and/or preventing use of forged configuration files relating to cable modem networks.

2. Description of Related Art

Broadband access technologies such as cable, fiber optic, and wireless have made rapid progress in recent years. There has been a convergence of voice and data networks, which is due in part to the deregulation of the telecommunications industry in the United States. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

One type of broadband access technology relates to cable modem networks. A cable modem network or "cable plant" employs cable modems, which are an improvement of conventional PC data modems and provide high speed connectivity. Cable modems are therefore instrumental in transforming the cable system into a full service provider of video, voice and data telecommunications services.

Cable service providers need to make different levels of service available to customers, typically with corresponding differences in price. For example, some customers may need relatively higher data transfer rates than others and are willing to pay a premium for a higher quality of service that can provide such transfer rates. Other customers may be content with a slower and less expensive service. Typically, the same type of cable modem is used by customers having a higher quality of service and customers having a lower quality of service. The cable service provider distinguishes between such customers based on configuration files assigned to different classes of customers.

Some customers have developed theft of service techniques for obtaining a higher quality of service than the service for which these customers have paid. Some such techniques take advantage of defects in the way a number of different vendor's cable modem products perform the Trivial File Transfer Protocol (TFTP) provisioning process. Some such defects allow end users to "fool" their cable modems into downloading a forged Data-over-Cable Service Interface Specifications (DOCSIS) configuration file from a local TFTP server rather than from the cable service provider's legitimate TFTP server, hence granting the thief a potentially higher level of service than that to which they are entitled. It would be very useful to be able to detect and/or prevent such theft of service.

SUMMARY OF THE INVENTION

Methods and devices are provided for detecting or preventing unauthorized upgrades to a customer's quality of service in an access data network. Several aspects of the invention require customer nodes to properly perform an initialization procedure. For example, the initialization procedure may involve making a request to a server controlled by, or at least trusted by, the service provider. The initialization procedure may involve downloading a configuration file, such as a DOCSIS configuration file, from the trusted server. According to some such aspects of the invention, nodes that cannot properly perform the initialization procedure are prevented from coming online. According to other such aspects of the invention, nodes that cannot properly perform the initialization procedure are marked. A warning may be sent to marked nodes. A customer associated with a marked node may be charged a higher rate for service. Alternatively, legal action may be taken against the customer.

According to some aspects of the invention, a method is provided for controlling a data network. The method includes: receiving a log-in request from a modem; sending information to the modem for enabling the modem to download a configuration file from a trusted server; and determining whether the modem downloads the configuration file from the trusted server. The method may include adding marking information to a description of the modem when the modem does not download the configuration file from the trusted server. The log-in request may be denied if the modem does not download the configuration file from the trusted server. The modem may be a cable modem and the configuration file may be a DOCSIS configuration file.

According to some aspects of the invention, the method involves monitoring modems that do not download the configuration file from the trusted server. A distinctive symbol, such as "#," may be assigned to distinguish such modems from modems that download the configuration file from the trusted server. Such a symbol facilitates associating an marked modem with other marked modems. A warning message may be sent to modems that do not download the configuration file from the trusted server. A service fee charged to a customer associated with the modem may be assessed or increased if the modem does not download the configuration file from the trusted server.

According to some embodiments of the invention, a cable modem termination system is provided that includes: a device for receiving a log-in request from a cable modem; an apparatus for sending information to the modem for enabling the cable modem to download a DOCSIS configuration file from a trusted server; a device for determining whether the cable modem downloads the DOCSIS configuration file from the trusted server; and an apparatus for denying the log-in request if the modem does not download the DOCSIS configuration file from the trusted server.

According to other embodiments of the invention, a cable modem termination system is provided that includes: a receiver for receiving a log-in request from a cable modem; a transmitter for sending information to the cable modem for enabling the cable modem to download a configuration file from a trusted server; and a processor for determining whether the cable modem downloads the configuration file from the trusted server. The processor may cause the log-in request to be denied if the cable modem does not download the configuration file from the trusted server. The configuration file may be a DOCSIS configuration file.

According to still other embodiments of the invention, a computer program is provided for controlling a terminal of an access data network to which a plurality of nodes is connected. The computer program is stored in a computer-readable medium and includes instructions for causing the terminal to receive a log-in request from a node of the plurality of nodes, send information to the node for enabling the node to download a configuration file from a trusted server, determine whether the node downloads the configuration file from the trusted server and mark the node if the node does not download the configuration file from the trusted server.

The terminal may be a head end complex and the node may be a cable modem. The program may include instructions for controlling the head end complex to monitor the cable modem if the cable modem does not download the configuration file from the trusted server. The marking step may involve associating a symbol with the cable modem. The program may also include instructions for controlling the head end complex to associate a marked modem with a plurality of marked modems, for example by grouping modems having an associated symbol. The computer program may include instructions for controlling the head end complex to increase a service charge to a customer associated with the cable modem if the cable modem does not download the configuration file from the trusted server. The program may include instructions for controlling the head end complex to send a warning message to the cable modem if the cable modem does not download the configuration file from the trusted server.

According to another embodiment of the invention, a computer program stored in a computer-readable medium is provided. The program includes instructions for controlling a head end complex to receive a log-in request from a cable modem, send information to the cable modem for enabling the cable modem to download a configuration file from a trusted server, determine whether the cable modem downloads the configuration file from the trusted server and deny the log-in request if the cable modem does not download the configuration file from the trusted server.

BRIEF DESCRIPTION OF THE DRAWINGS

The invention may best be understood by reference to the following description taken in conjunction with the accompanying drawings, which are illustrative of specific embodiments of the present invention.

FIG. 2A indicates files associated with a plurality of online modems according to some aspects of the invention.

DETAILED DESCRIPTION OF SPECIFIC EMBODIMENTS

Generally, the methods of the present invention may be implemented on software and/or hardware. For example, the invention can be implemented in an operating system kernel, in a separate user process, in a library package bound into network applications, on a specially constructed machine, or on a network interface card. In a specific embodiment of this invention, the technique of the present invention may be implemented in software such as an operating system or in an application running on an operating system.

A software or software/hardware hybrid system of this invention is preferably implemented on a general-purpose programmable machine selectively activated or reconfigured by a computer program stored in memory. Such a programmable machine may be a network device such as a terminal designed to handle network traffic between the terminal and a plurality of network nodes. Such network devices typically have multiple network interfaces. One important class of device that may be used to implement the present invention is the Cable Modem Termination System (CMTS). Preferably, the CMTS is a "routing" CMTS, which handles at least some routing functions. Alternatively, the CMTS may be a "bridging" CMTS, which handles only lower-level tasks.

Figure 1:
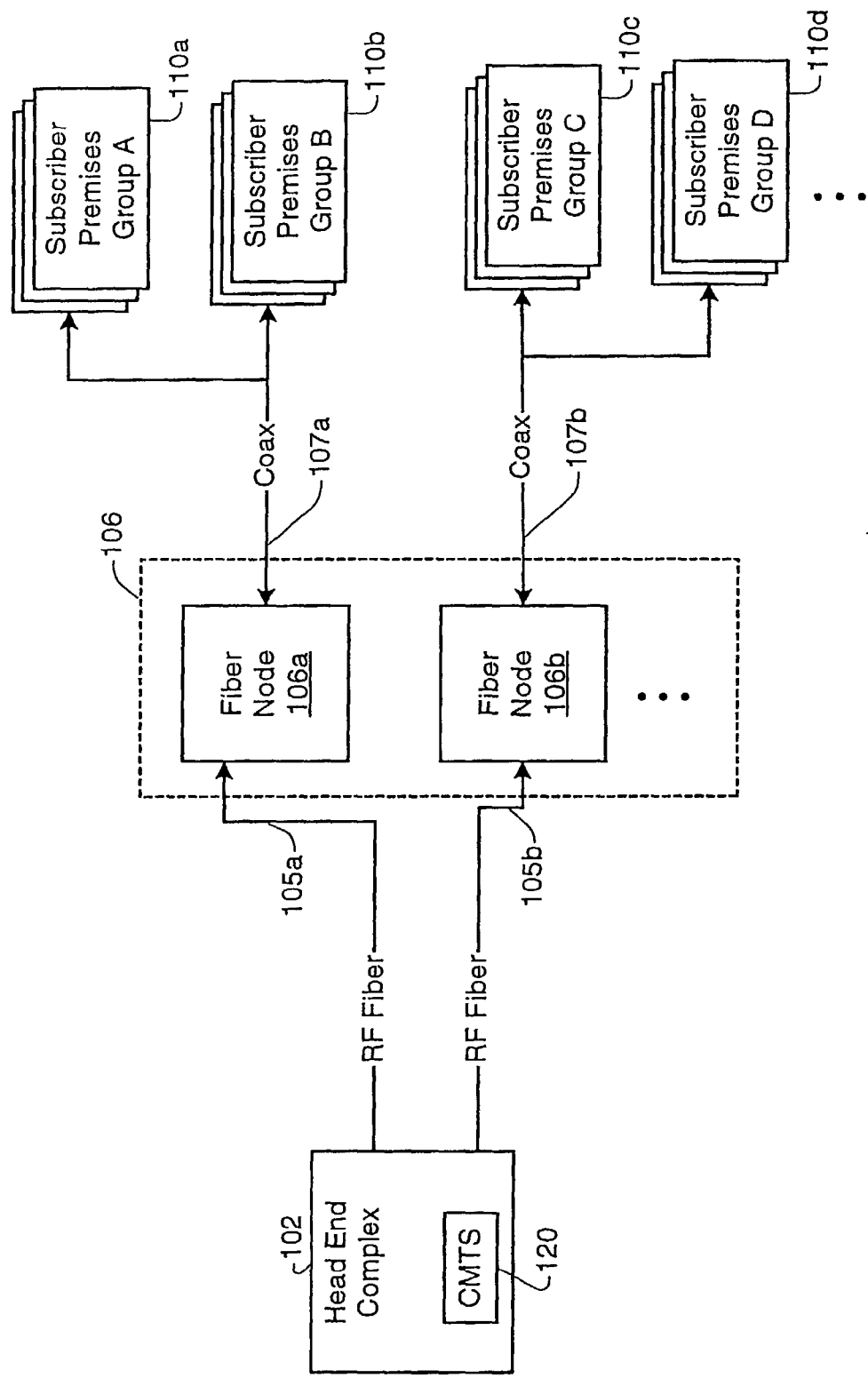
FIG. 1 is a block diagram that illustrates a cable network.

FIG. 1 shows a block diagram of a two-way hybrid fiber-coaxial (HFC) cable network 100. As shown in FIG. 1, the cable network 100 includes a head end complex 102, which is typically configured to service about 40,000 homes. The head end complex 102 may include a plurality of components and/or systems (not shown) such as, for example, a head end, a super head end, a hub, a primary hub, a second hub, etc. Additionally, as shown in FIG. 1, the head end complex 102 includes a CMTS. Primary functions of the CMTS include: (1) receiving data inputs from external sources 100 and converting the data for transmission over the cable plant; (2) providing appropriate Media Access Control (MAC) level packet headers for data received by the cable system; and (3) modulating and demodulating the data to and from the cable network. Typically, the head end complex 102 is configured to provide a communication interface between nodes (e.g. cable modems) in the cable network and external networks such as, for example, the Internet. The cable modems typically reside at the subscriber premises 110A-D.

In this embodiment, head end complex 102 is connected to one or more fiber nodes 106 in the cable network. Each fiber node is, in turn, configured to service one or more subscriber groups 110. Each subscriber group typically comprises about 500 to 2000 households. A primary function of the fiber nodes 106 is to provide an optical-electronic signal interface between the head end complex 102 and the plurality of cable modems residing at the plurality of subscriber groups 110.

In order for data to be able to be transmitted effectively over a wide area network such as HFC or other broadband computer networks, a common standard for data transmission is typically adopted by network providers. A commonly used and well known standard for transmission of data or other information over HFC networks is the Data Over Cable System Interface Specification (DOCSIS). The DOCSIS standard has been publicly presented by Cable Television Laboratories, Inc. (Louisville, Colo.), in a document entitled, DOCSIS 1.1 RF Interface Specification (document control number SP-RFIv1.1-106-001215, Dec. 15, 2000). That document is incorporated herein by reference for all purposes. However, the present invention is not limited to data transmissions that use the DOCSIS standard. Any convenient standard may be used, depending upon various factors, including the type of data network used to implement the present invention.

Communication between head end complex 102 and fiber node 106a is implemented using modulated optical signals that travel over fiber optic cables. More specifically, during the transmission of modulated optical signals, multiple optical frequencies are modulated with data and transmitted over optical fibers such as, for example, optical fiber links 105a and 105b of FIG. 1, which are typically referred to as "RF fibers". As shown in FIG. 1, the modulated optical signals transmitted from the head end complex 102 eventually terminate at the fiber node 106a. The fiber nodes maintain the signal modulation while converting from the fiber media to the coax media and back.

Each of the fiber nodes 106 is connected by a coaxial cable 107 to a respective group of cable modems residing at subscriber premises 110A-D. According to the DOCSIS standard, specific frequency ranges are used for transmitting downstream information from the CMTS to the cable modems, and other specific frequency ranges are used for transmitting upstream information from the cable modems to the CMTS.

In order to allow the cable modems to transmit data to the CMTS, the cable modems share one or more upstream channels within that domain. Access to the upstream channel is normally controlled using a time division multiplexing (TDM) approach. Such an implementation requires that the CMTS and all cable modems sharing an upstream channel within a particular domain have a common concept of time so that when the CMTS tells a particular cable modem to transmit data at time T, the cable modem understands what to do. "Time" in this context may be tracked using a counter, commonly referred to as a timestamp counter, which, according to conventional implementations is a 32-bit counter that increments by one every clock pulse.

In this embodiment, digital data on upstream and downstream channels of the cable network is carried over radio frequency ("RF") carrier signals. Cable modems convert digital data to a modulated RF signal for upstream transmission and convert downstream RF signal to digital form. The conversion is done at a subscriber's facility. At a CMTS, the conversions are reversed. The CMTS converts downstream digital data to a modulated RF signal, which is carried over the fiber and coaxial lines to the subscriber premises. The cable modem then demodulates the RF signal and feeds the digital data to a computer. On the return path, the digital data is fed to the cable modem (from an associated PC, for example), which converts it to a modulated RF signal. Once the CMTS receives the upstream RF signal, it demodulates the signal and transmits the digital data to an external source.

Figure 2:
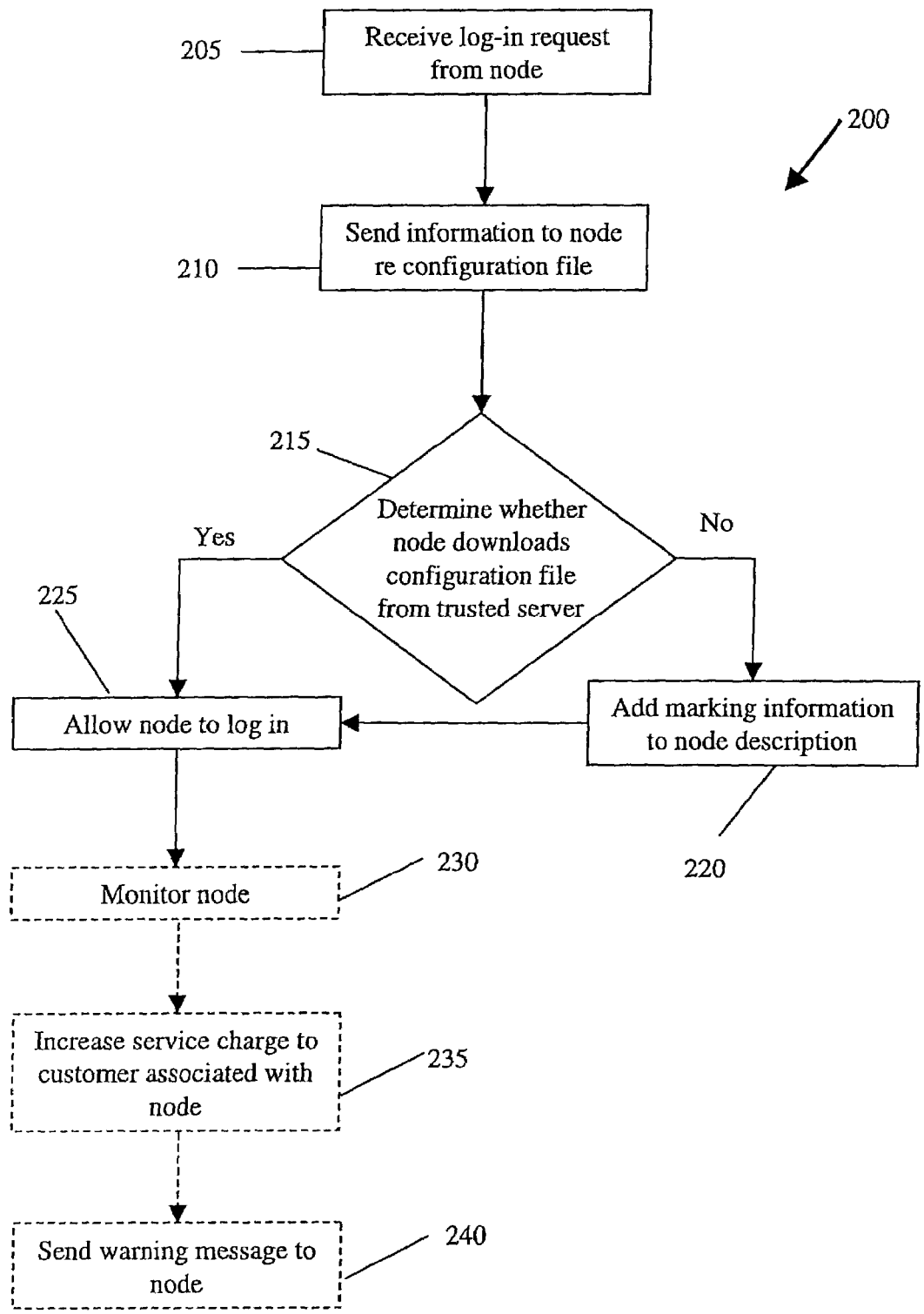
FIG. 2 is a flow chart that describes some aspects of the invention.

FIG. 2 is a flow chart that illustrates method 200 of the present invention. In step 205, a log-in request is received from a network node. According to some aspects of the present invention, the log-in request may be received by head end complex 102 from a cable modem residing at one of subscriber premises 110. Although the steps illustrated in FIGS. 2 and 3 will be described according to such aspects of the invention, the present invention is not limited to cable networks. Therefore, the log-in request could originate in any one of a wide variety of network nodes, as will be described in detail below.

In step 210, information is sent to the network node for enabling the network node to perform an initialization process. In some embodiments, the network node is commanded to perform an initialization process, such as downloading a configuration file from a trusted server. As used herein, a "trusted server" is a server that is either under the control of the network service provider or a trusted third party. A trusted server maintained by a third party could provide security to the network service provider by any means known in the art, such as by maintaining public/private keys, requiring digital signatures, or by making security decisions based on predetermined policies.

In this example, head end complex 102 provides information to the cable modem that made the log-in request to enable the cable modem to download a DOCSIS configuration file from a trusted server. In some aspects of the invention, head end complex 102 relays a DOCSIS configuration file name and an address of a trusted server from which the DOCSIS configuration file may be downloaded.

In some such aspects of the invention, this information is relayed by head end complex 102 from a trusted Dynamic Host Configuration Protocol (DHCP) server in DHCP format. The information may include a temporary IP address for the cable modem and the IP address of one or more other trusted servers that the cable modem will require for part of the initialization process. One of the other trusted servers is a server (e.g., a TFTP server) from which the DOCSIS configuration file may be downloaded. The configuration file preferably includes quality of service parameters, such as the maximum allowed data transmission and reception speeds for the cable modem. The information sent to the cable modem may also include the addresses of a "time of day" server, a server to which the cable modem may send status information, such as error or failure information, and a default router.

In step 215, it is determined (e.g., by a processor within a routing engine or a line card of head end complex 102) whether the cable modem has downloaded the configuration file from a trusted server. Preferably, the cable modem is required to download the configuration file via head end complex 102, in order for step 215 to be performed reliably. In some aspects of the invention, step 215 is accomplished by confirming that any subsequent request was made to a server by the cable modem via the CMTS. In alternative aspects of the invention, step 215 is accomplished by confirming that the request is directed to the address of the trusted server specified in the information sent by the CMTS to the cable modem. In yet other aspects of the invention, the CMTS confirms not only that the request was directed to the proper trusted server, but also that the request is directed to the configuration file name specified in the information sent by the CMTS to the cable modem. In method 200, whether or not the cable modem performs this initialization procedure, the cable modem is allowed to log in (step 225).

However, if the cable modem does not download the DOCSIS configuration file from the trusted server, marking information is added to a node description in step 220. For example, a symbol such as an asterisk (*) or the pound symbol (#) may be inserted in a predetermined field of a file associated with the cable modem and stored, at least temporarily, in a memory of the head end complex.

FIG. 2A illustrates one such format. In this example, a "#" symbol has been inserted into the "online state" field of cable modem number 5, indicating that cable modem 5 did not download the DOCSIS configuration file from the trusted server. "Online" means that cable modem 5 was allowed to log in and "(Pt)" means that transmissions to and from cable modem 5 are encrypted. One of skill in the art will appreciate that in other embodiments, other fields can be marked and other symbols can be used. The marking information allows convenient tracking and monitoring of nodes that do not perform the required initialization procedure. For example, if the marking information is a symbol in a predetermined field of a computer file associated with such nodes, searching for the symbol in the predetermined filed will associate a marked modem with a plurality of other marked modems.

Here, the "Interface" field indicates that the port of the CMTS that is sending data to cable modem number 5 (the "downstream port") is Cable4/0 and that the port of the CMTS that is receiving data from cable modem number 5 (the "upstream port") is U1. "Prim Sid" is a unique service identifier for modems attached to a line card of the CMTS. These components will be discussed in detail below with reference to FIGS. 4 and 5. The "timing offset" field indicates the round trip time for signals between head end complex 102 and the cable modem. In some embodiments, the units of the timing offset field are DOCSIS ticks divided by 64, which equals 6.25 micro seconds divided by 64.

The "Rec Power" field indicates the level of power of the signals received from each cable modem. In this instance, the CMTS is receiving signals from cable modem 5 at a level of 0.25 decibel millivolts. The QoS field indicates relative levels of quality of service provided to each cable modem. Here, all of the other listed cable modems have a QoS of 5, whereas cable modem 5 has a higher QoS level of 8. Moreover, the CPE field indicates that cable modem 5 has 2 attached devices, whereas the other listed cable modems have no devices or 1 device attached to the cable modem. The values in the QoS and CPE fields may be cross-referenced with stored data regarding the QoS and CPE values for which each customer has paid. In this example, the customer associated with cable modem 5 has paid for a QoS of 5 and is entitled to attach only 1 device to the cable modem. The IP address and MAC address fields indicate the corresponding addresses for each cable modem.

In some aspects of the present invention, if the cable modem does not download the DOCSIS configuration file from the trusted server, the QoS provided to the cable modem is affected. According to some such aspects of the invention, a "cap" is applied for quality of service. This cap may reflect the quality of service for which an individual subscriber has paid. In the foregoing example, the customer associated with cable modem 5 paid for a QoS of 5, so the cap would be set to a QoS of 5. Alternatively, the cap may be determined from other parameters or arbitrarily set to a particular QoS, e.g., a low QoS.

Some aspects of the invention include optional monitoring step 230, which can take various forms. According to some aspects of the invention, information about marked nodes is stored in a memory. In some such aspects of the invention, if a node fails to use the required initialization procedure for a predetermined number of log-in requests, a customer associated with the node will be charged an increased service fee for access to the network (optional step 235). According to other such aspects of the invention, if the node fails to use the required initialization procedure for a predetermined number of log-in requests, a warning message is sent to the node (optional step 240). In yet other aspects of the invention, the process proceeds to optional steps 235 and/or 240 after a single failure to perform the required initialization procedure. For example, if a node is receiving a higher QoS level than that to which the corresponding customer is entitled (as in the case of cable modem 5), a warning message would be sent and/or higher charge would be made after a single failure to perform the required initialization procedure.

Figure 3:
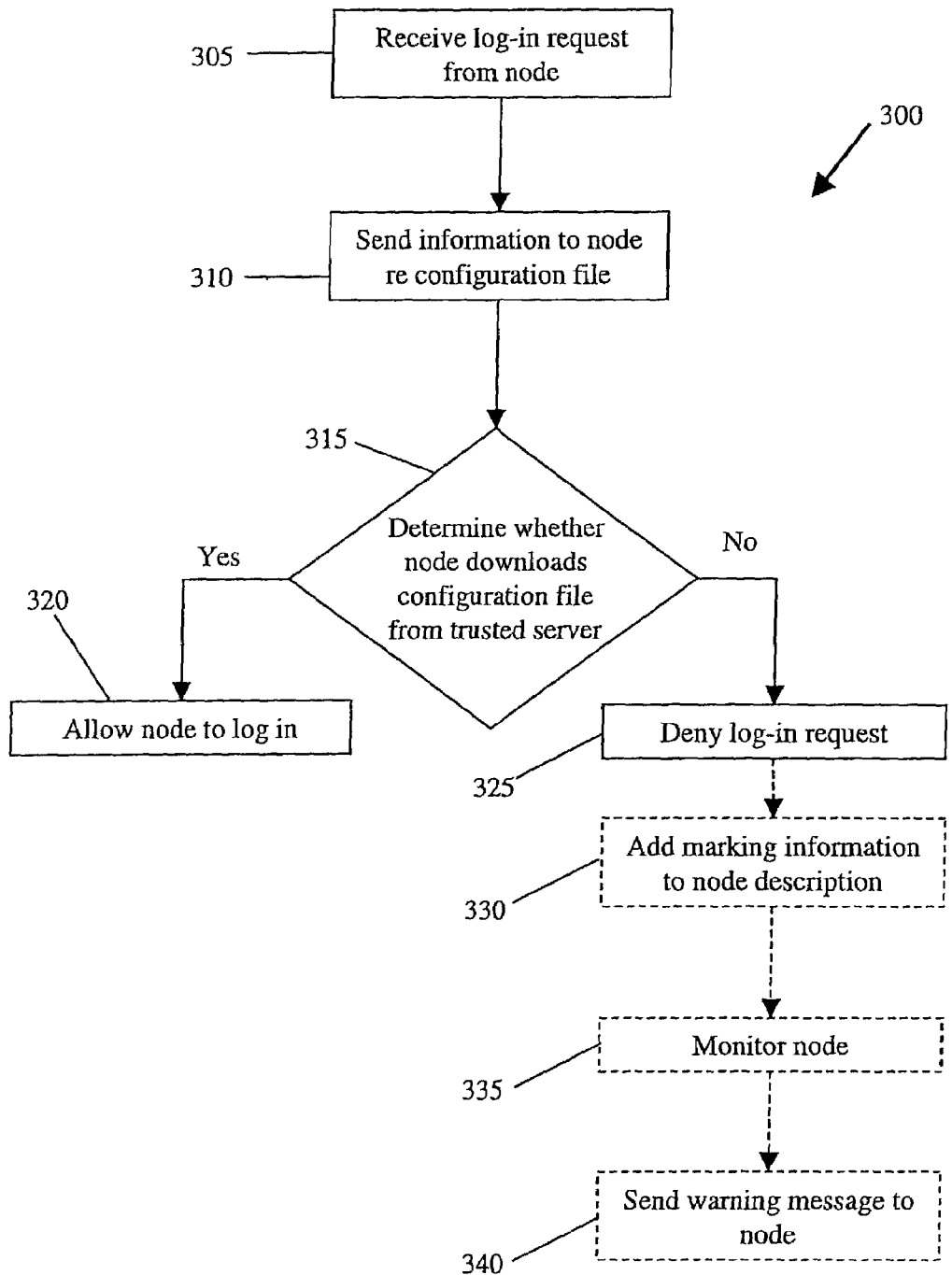
FIG. 3 is a flow chart that describes certain aspects of the invention.

FIG. 3 is a flow chart that illustrates method 300 of the present invention. Steps 305, 310 and 315 parallel those of steps 205, 210 and 215. As in method 200, if it is determined in step 315 that the node has perform a required initialization procedure, such as downloading a configuration file from a trusted server in this example, the node is allowed to log in. However, if the node does not download the configuration file from the trusted server, the log-in request is denied in step 325. In some aspects of method 300, marking information is added to the node description as described above in optional step 330.

In some such aspects of the invention, the marking information is used to identify which nodes should be monitored (step 335) and/or identify which nodes should receive a warning message (step 340). It may be useful, for example, to determine which nodes are consistently attempting to log in without performing the required initialization procedure. According to some aspects of the invention, a warning message will be sent only after a node has made a predetermined number of attempts to log in without performing the required initialization procedure.

According to some aspects of the invention, method 200 is employed prior to method 300. For example, nodes that attempt to log in without performing the required initialization procedure may initially be marked, in order to gauge the extent of the potential theft-of-service problem, before log-in requests made by such nodes are denied. Marking and evaluating such nodes may prevent certain types of nodes from being incorrectly barred from service.

For example, some cable modems (typically those running older releases of firmware) may cache their configuration file rather than retrieving it from the service provider's trusted server each time the cable modem comes online. This feature may marginally improve the time it takes for a cable modem to come online after an outage. However, this violation of the required initialization procedure is not easily distinguishable from certain kinds of theft of service attempts. For this reason, when such cable modems come online and skip the configuration file download in lieu of using a cached version of the configuration file, these modems are preferably marked for further evaluation.

Some cable service providers may use the "Upstream Channel ID" or "Downstream Frequency" fields in their DOCSIS configuration files in order to force certain cable modems to use a particular downstream or upstream channel. There are a small number of cable modems that respond to these fields by coming online against the new channel and failing to perform a configuration file download attempt. Therefore, if the upstream channel ID or downstream frequency fields are used within any of the DOCSIS configuration files commonly deployed in a service provider's system, it is preferable that modems which violate the required initialization procedure are marked for further evaluation.

Alternative Hardware Configurations

Figure 4:
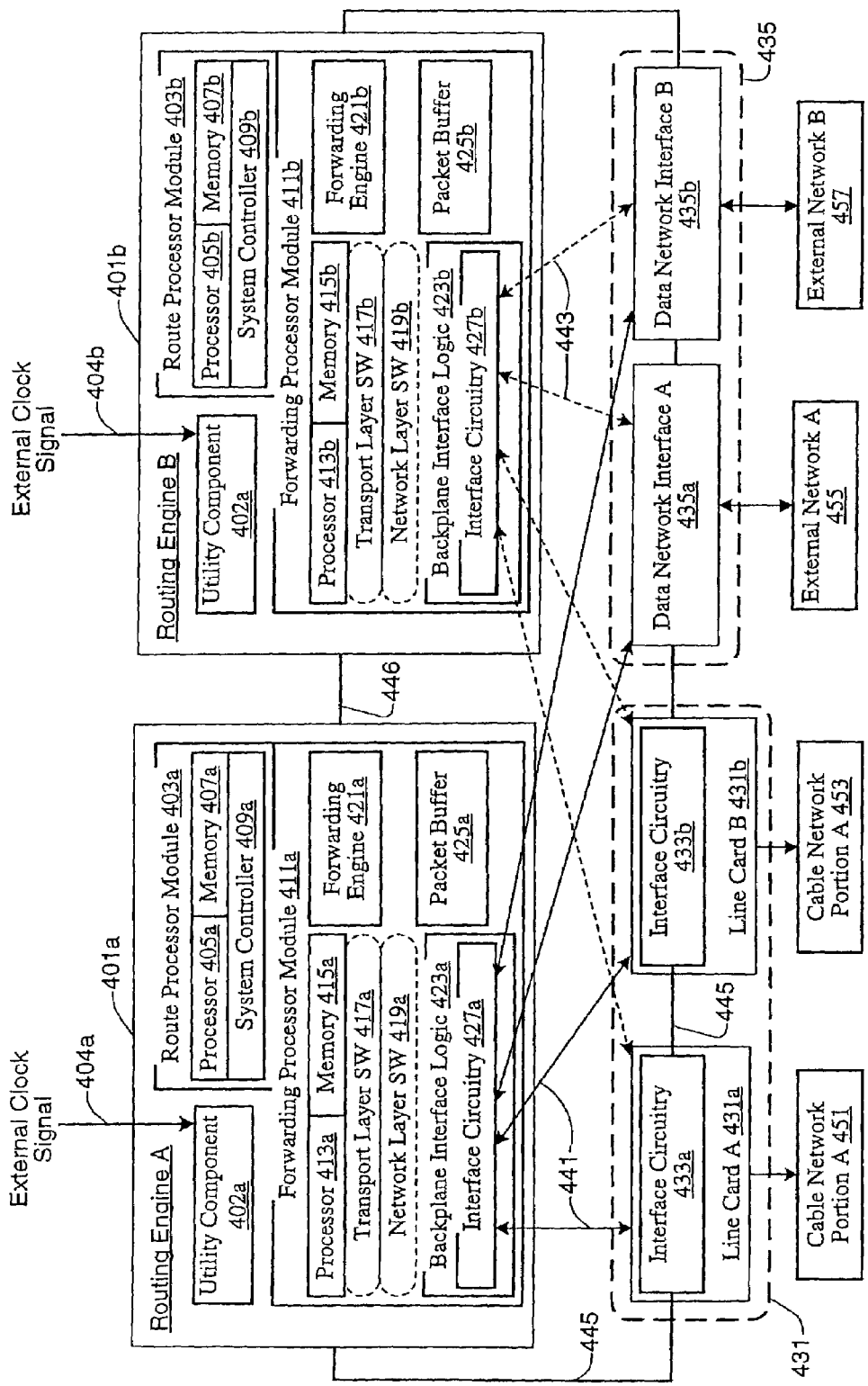
FIG. 4 is a block diagram that illustrates one embodiment of a cable modem termination system.

Various hardware configurations for implementing the invention will be described below with reference to FIGS. 4 through 8. FIG. 4 shows a block diagram of a specific embodiment of CMTS 400 that may be used to implement certain aspects of the present invention. As shown in FIG. 4, the CMTS 400 may comprise a plurality of routing engines (e.g., 401a and 401b). In a specific implementation, Routing Engine A (401a) may be configured as a primary or working routing engine, while Routing Engine B (401b) may be configured as a backup or standby routing engine that provides redundancy functionality.

As shown in the embodiment of FIG. 4, each of the routing engines may include a variety of similar modules and/or components. In order to avoid confusion, the various components and/or modules relating to Routing Engine A (401a) will now be described in greater detail, with the understanding that such descriptions may also be applied to the corresponding components and modules of Routing Engine B (401b).

According to a specific embodiment, Routing Engine A may be configured or designed to include a plurality of functionally different modules or components, including, for example, a Forwarding Processor (FP) Module 411*a* adapted to provide packet forwarding functionality; a Route Processor (RP) Module 403*a* adapted to implement routing or forwarding operations; and a utility component 402*a* adapted to provide system clock and timestamp functionality. The routing engine components may be configured to provide layer one, layer two, layer three and layer four functionality as well as quality of service (QoS) functionality.

According to a specific implementation, the RP Module 403*a* may be configured as a processor-based routing system comprising functionality incorporated within a typical router, such as, for example, any of specially configured router models 1600, 2500, 2600, 3600, 4500, 4700, 7200, 7500, 10012, and 12000 available from Cisco Systems, Inc. of San Jose, Calif. For example, as shown in the embodiment of FIG. 4, the RP Module 403*a* includes a general-purpose processor 405*a* (e.g., a MIPS route processor) coupled to a system controller 409*a* and memory 407*a*.

It should be noted that components have been described in singular form for clarity. One skilled in the art would appreciate that multiple processors, a variety of memory formats, or multiple system controllers, for example, can be used in this context as well as in other contexts while falling within the scope of the present invention. The memory 407*a* may comprise synchronous dynamic random access memory (SDRAM) storage locations addressable by the processor 405*a* for storing software programs and data structures accessed by the components. A network routing operating system, portions of which may reside in memory and executed by the route processor, functionally organizes the router by invoking network operations in support of software processes executing on the router.

The RP processor 405*a* may be configured to construct and load routing tables used by the FP Module 411*a*. The processor 405*a* may also be configured or designed to perform configuration management functions of the routing engine 401*a*, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 427*a* may be coupled to the respective interface circuitry 433*a*, 433*b* of line cards 431*a*, 431*b*. According to a specific implementation, interface circuitry 427*a* may be configured to reside on a backplane logic circuit 423*a* of the routing engine. In one example, the backplane logic circuit 423*a* is embodied as a high performance, application specific integrated circuit (ASIC). An example of a backplane logic circuit that may be advantageously used with the present invention is disclosed in co-pending and commonly owned U.S. patent application Ser. No. 09/791,063, filed on Feb. 22, 2001, the entirety of which is hereby incorporated by reference for all purposes.

According to a specific embodiment, the backplane logic circuit (which, according to a specific implementation, may be configured as an ASIC), may be configured to further interface the line cards to a packet buffer 425*a* and a forwarding engine 421*a* of the FP Module 411*a*. The packet buffer 425*a* may include memory that is configured to store packets as the forwarding engine 421*a* performs its packet forwarding functions. For example, the packet buffer may be used to store low priority data packets while high priority, low latency voice packets are forwarded by the forwarding engine to a data network interface 435*a*. According to various embodiments, the FP Module 411 may comprise a processor 413*a* and memory 415*a* for handling transport layer 417 and network layer 419 functionality. In one implementation, the processor 413*a* may be configured to track accounting, port, and billing information for various users on a cable modem network 451. The processor 413*a* may also be configured to maintain desired service flow or session state information in memory 415*a* such as, for example, for voice calls initiated over the cable modem network. The FP Module 411*a* may also be configured to provide transaction compacting functionality, data parcel tunneling functionality, switching functionality, log-in monitoring functionality as described above, etc.

According to a specific implementation, Routing Engine A 401*a* may be connected to Routing Engine B 401*b* via at least one link 446, such as, for example, a backplane line or system bus. Routing engine redundancy may be provided by designating one of the routing engines as the working or primary routing engine and designating the other routing engine(s) as the redundant or standby routing engine(s). When configured as a working routing engine, the Routing Engine A may perform all appropriate forwarding and routing functions. When a failure occurs at the working routing engine, the redundant routing engine (e.g. Routing Engine B) may then take over the operations of the working routing engine. Thereafter, when Routing Engine A recovers, it may assume the functions of the redundant routing engine, or it may take over the functions of the working routing engine.

According to different embodiments of the present invention, one or more of the routing engines may be configured to communicate with a plurality of line cards (e.g. 431 and 435) via point-to-point links. For example, as shown in FIG. 4, each of the plurality of line cards 431 and 435 are connected to each of the routing engines 401*a*, 401*b* via point-to-point links 441 and 443. One advantage of the point-to-point link configuration is that it provides additional reliability in that the failure of one or more line cards will not interfere with communications between other line cards and the routing engine(s). For example, if Line Card A 431*a* suddenly failed, each of the routing engines would still be able to communicate with the other line cards.

According to a specific embodiment, the plurality of line cards may include different types of line cards that have been specifically configured to perform specific functions. For example, line cards 431 may correspond to radio-frequency (RF) line cards that have been configured or designed for use in a cable network. Additionally, line cards 435 may correspond to network interface cards that have been configured or designed to interface with different types of external networks (e.g. WANs and/or LANs) utilizing different types of communication protocols (e.g. Ethernet, Frame Relay, ATM, TCP/IP, etc). For example, the data network interface 435*a* functions as an interface component between external data sources and the cable system. The external data sources transmit data to the data network interface 435*a* via, for example, optical fiber, microwave link, satellite link, or through various media. A data network interface may include hardware and software for interfacing to various networks. According to various embodiments, a data network interface may be implemented on a line card as part of a conventional router for a packet-switched network. Using this type of configuration, the CMTS is able to send and/or receive IP packets to and from the data network interface using, for example, network layer software 419*a*.

According to a specific implementation, the operations associated with obtaining an IP address for cable modems may be implemented by the network layer software. This may involve the CMTS communicating with a DHCP server (not shown) via a data network interface, for example.

As shown in FIG. 4, at least a portion of the line cards includes interface circuitry for providing an appropriate interface between the host line card, other line cards, and/or the routing engine(s). For example, interface circuitry 433*a* may include interconnect ports coupled to one or more of the point-to-point links 441, 443. According to a specific implementation, the interface circuitry functions as a translator that converts conventional formats of data received at the line cards to a suitable protocol format for transmission from the line card to the appropriate routing engine. In one implementation, the interface circuitry 433*a* may also include circuitry to perform cyclic redundancy code (CRC) generation and checking on packets, along with interconnect format checking.

According to a specific embodiment, the point-to-point links 441, 443 may be configured as clock forwarded links such that each point-to-point link comprises a at least one data wire for transporting data signals and at least one clock wire for carrying clock signals. However, it will be understood to those skilled in the art that the clock forwarding technique may be scaled to accommodate other clock forwarding arrangements such as, for example, connections comprising a plurality or data signals and/or clock signals. Additionally, according to a specific embodiment, each line card may be configured to provide at least one communication interface between the routing engines (401*a* and 401*b*) and a portion of the cable network. The data network interface 435*a* may couple the routing engine 401*a* to an external data network 455 such as, for example, the Internet.

According to one embodiment, all or selected lines cards, routing engines and/or data network interfaces may be configured to use at least one common dedicated line or backplane (e.g. 445). According to other embodiments, routing engines 401*a* and 401*b* may have an additional dedicated connection(s) for supporting redundancy. In a specific implementation, the backplane may be configured as an Ethernet medium that is shared by the CMTS. When the line cards are inserted into the backplane, they communicate with the routing engines over the lines 445 in accordance with a "capabilities" exchange that identifies the types of line cards and their various characteristics/parameters.

According to a specific implementation, during initialization of the CMTS, the routing engines 401*a* and 401*b* negotiate for working routing engine status over the backplane. Assertion of working status causes the line cards 431 to configure their respective interface circuitry to communicate with the designated working routing engine (e.g. Routing Engine A 401*a*). The Routing Engine A 401*a* then configures the CMTS and line cards, establishes routing relationships, and initiates traffic forwarding operations. The redundant routing engine 401*b* may complete a self-test and perform initialization of its various functions. The two routing engine assemblies may then exchange conventional negotiation messages (which may include, for example, health and status messages) via the backplane lines 445. According to a specific implementation, the exchanged messages are defined by an Enhanced High System Availability (EHSA) negotiation algorithm available from Cisco Systems, Inc. of San Jose, Calif. The redundant routing engine may also request transaction information from the working routing engine.

When the redundant routing engine 401*b* detects that the primary routing engine has failed, the redundant routing engine may take over as the new working routing engine, and initiate a "cutover" operation to thereby cause the line card interface circuitry (e.g. 433*a* and 433*b*) to identify and communicate with the new working routing engine 401*b*. The new working routing engine 401*b* may then access and retrieve state information (such as, for example, telephone call state information, service flow state information, etc.) stored on selected line cards in order to maintain existing service flows.

Prior to a failure situation, the redundant routing engine 401*b* may be configured to monitor the status of the working routing engine 401*a* and may further be configured or designed to receive updated configuration, transaction and/or state information, which may then be stored in an appropriate location in the redundant routing engine 401*b*.

The line cards may further comprise circuitry for "looping" packets back onto the redundant routing engine 401*b* over the point-to-point links. This allows the redundant routing engine 401*b* to send and receive test packets to evaluate its own operation in addition to the operation of the dedicated lines prior to the occurrence of a system failure.

The techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 4 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 407*a*, 415*a*, etc.) configured to store program instructions for the network operations and other functions of the present invention described herein. The program instructions may specify an operating system and one or more applications, for example. Such memory or memories may also be configured to store data structures, configuration states, information regarding log-in attempts, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to: magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Figure 5:
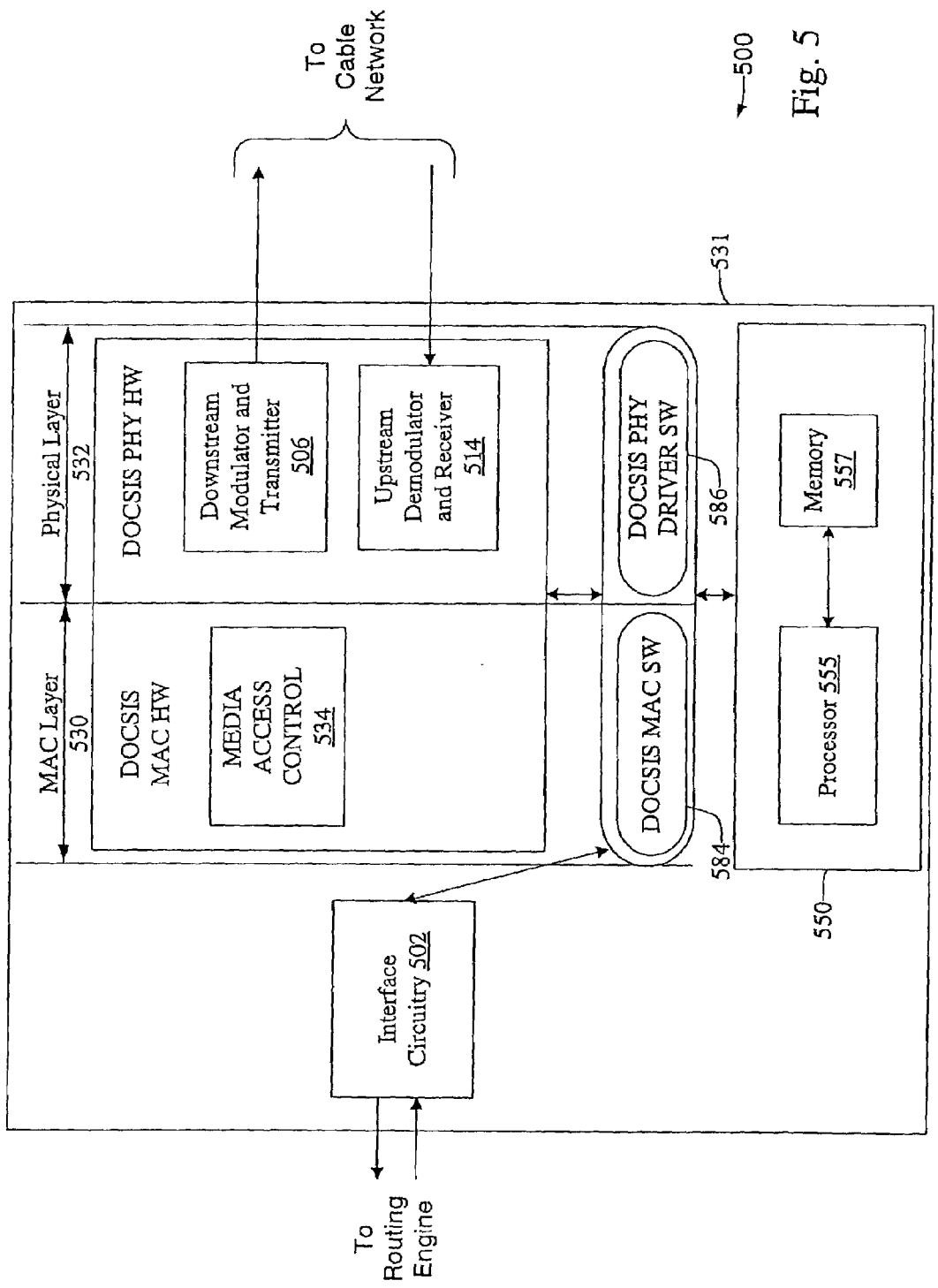
FIG. 5 is a block diagram that illustrates one embodiment of a line card.

FIG. 5 shows a specific embodiment of a line card 500, which may be used for implementing certain aspects of the present invention. According to a specific embodiment, the line card 500 may be configured or designed to implement selected aspects of the DOCSIS functionality that may otherwise be implemented by the CMTS, such as, for example, DOCSIS MAC functionality.

In the specific embodiment as shown in FIG. 5, line card 500 provides functions on several network layers, including a physical layer 532, and a Media Access Control (MAC) layer 530. Generally, the physical layer is responsible for receiving and transmitting RF signals on the cable plant. Hardware portions of the physical layer include at least one downstream modulator and transmitter 506 and/or at least one upstream demodulator and receiver 514. The physical layer also includes software 586 for driving the hardware components of the physical layer.

Upstream optical data signals (packets) arriving via an optical fiber node are converted to electrical signals, and then demodulated by the demodulator/receiver 514. The demodulated information is then passed to MAC layer block 530.

A primary purpose of MAC layer 530 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems (if sent downstream), or to the CMTS (if sent upstream). Note that the cable modems also include MAC addressing components. In the cable modems, these components encapsulate upstream data with a header containing the MAC address of the CMTS.

MAC layer 530 includes a MAC hardware portion 534 and a MAC software portion 584. The MAC layer software portion may include software relating to DOCSIS MAC functionality, etc. The MAC layer hardware and software portions operate together to provide the above-described DOCSIS MAC functionality. In one embodiment, MAC controller 534 is dedicated to performing some MAC layer functions and is distinct from processor 555.

After MAC layer block 530 has processed the upstream information, it is then passed to interface circuitry 502. As described previously, interface circuitry 502 includes the appropriate hardware and/or software for converting data formats received at the line cards to a suitable protocol format for transmission from the line card to an appropriate routing engine.

When a packet is received from the routing engine at the interface circuitry 502, the packet is then passed to MAC layer 530. The MAC layer 530 transmits information via a one-way communication medium to downstream modulator and transmitter 506. Downstream modulator and transmitter 506 takes the data (or other information) in a packet structure and converts it to modulated downstream frames, such as MPEG or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data is likewise modulated using, for example, QAM16 or QSPK. According to a specific embodiment, the modulated data is converted from IF electrical signals to RF electrical signals (or vice-versa) using one or more electrical signal converters (not shown).

As shown in FIG. 5, line card 500 includes a central hardware block 550 including one or more processors 555 and memory 557. These hardware components interact with software and other hardware portions of the various layers within the line card. They provide general purpose computing power for much of the software. Memory 557 may include, for example, I/O memory (e.g. buffers), program memory, shared memory, etc. One or more data structures used for implementing the technique of the present invention may reside in such memory. In one embodiment, the software entities 582, 584, and 586 are implemented as part of a network operating system running on hardware 550. Preferably, at least a part of the functionality of this invention are implemented in software as part of the operating system. In FIG. 5, such software may be part of MAC layer software 584, or may be closely associated therewith. Of course, the logic necessary to implement the methods of the present invention could reside in hardware, software, or some combination of the two.

According to a specific implementation, the procedures typically employed by the CMTS during registration and pre-registration may be performed at the MAC layer of the line card 500. In such an embodiment, most of the registration operations may be performed by the hardware and software provided for MAC layer logic 530.

Figure 6:
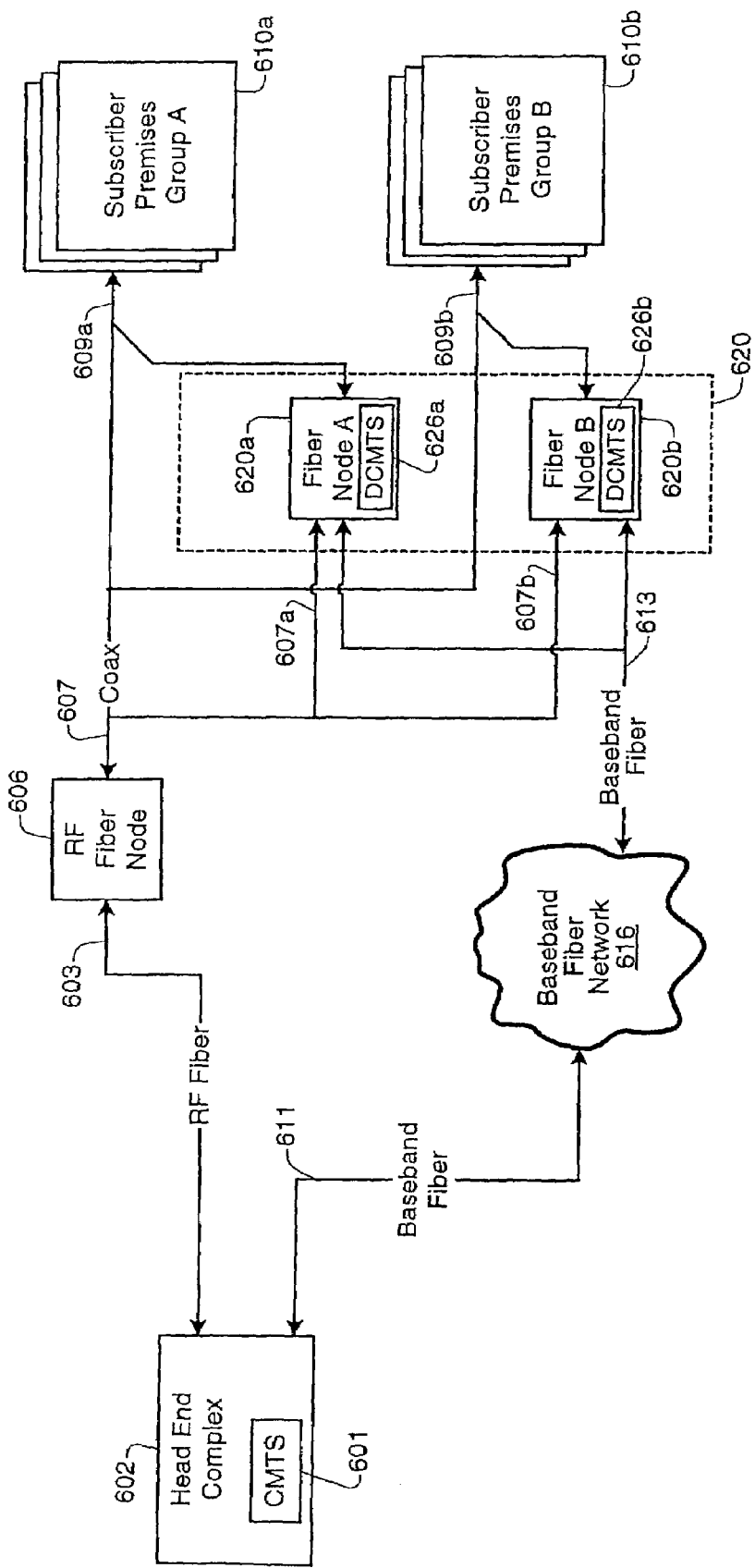
FIG. 6 is a block diagram that illustrates an alternative cable network.

It will be appreciated that, according to a specific embodiments, at least a portion of functions described herein that are performed by the CMTS (e.g. FIG. 4), line cards (e.g. FIG. 5), and/or selected components thereof, may be implemented in a centralized CMTS system (e.g. residing at the head end complex of the cable network, as shown, for example, in FIG. 1), and/or may be implemented at one or more distributed CMTS (DCMTS) systems (e.g. residing at one or more fiber nodes, as shown, for example, in FIG. 6).

Further, it will be appreciated by one having ordinary skill in the art that the technique of the present invention may be implemented in any computer network having a standardized protocol for utilizing a central termination system (e.g. head end) to schedule timeslots for remote stations or nodes on a return (or upstream) channel. In wireless networks, the central termination system may be referred to as a head end or wireless base station. In satellite networks, the central termination system may be referred to as a master controlling station.

Figure 7:
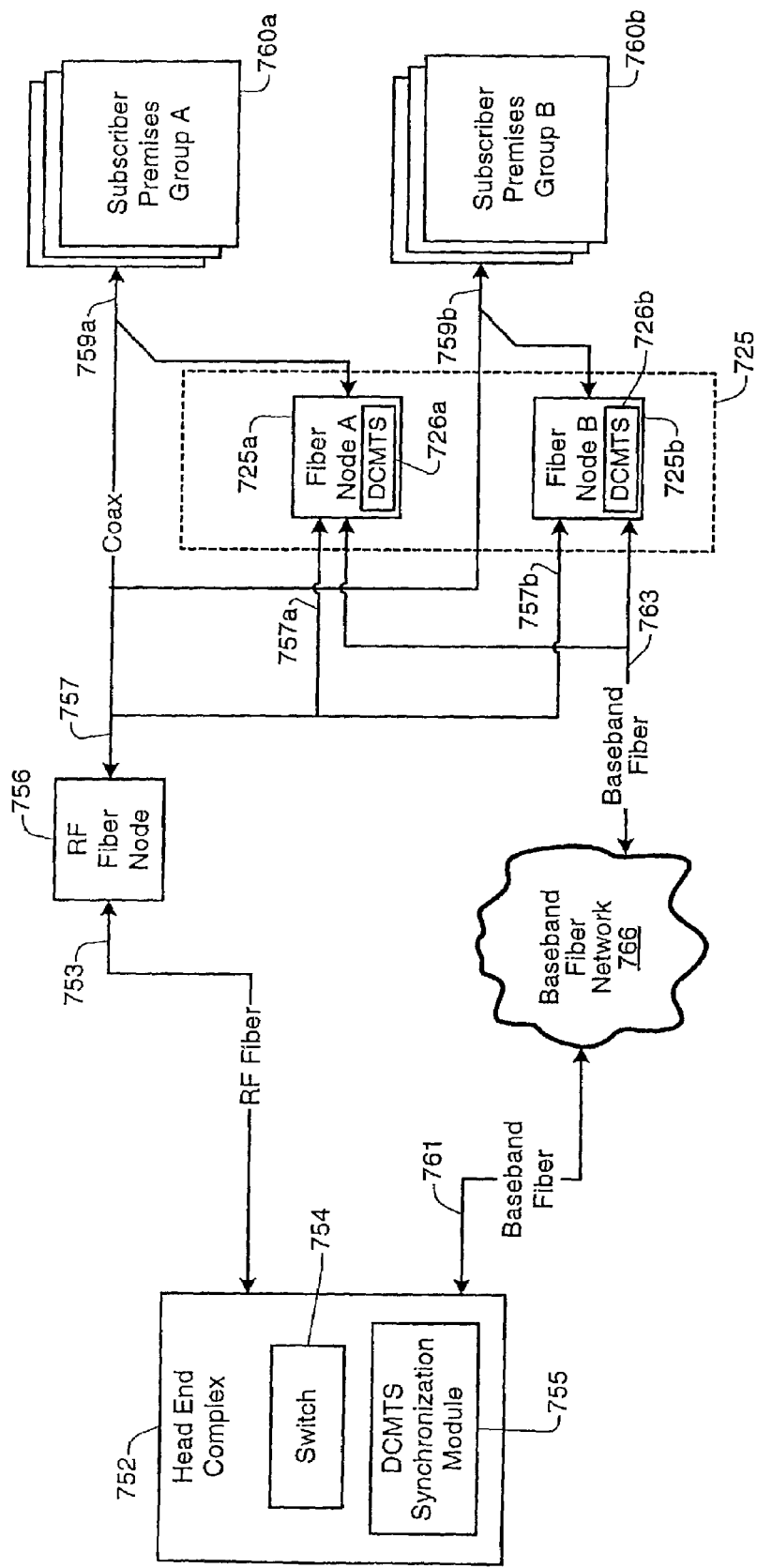
FIG. 7 is a block diagram that illustrates another cable network.

FIGS. 6 and 7 illustrate specific embodiments of cable networks that may be used for implementing the techniques of the present invention. In the embodiment of FIG. 6, the head end complex 602 includes a centralized CMTS device 601 that may be configured to implement DOCSIS functionality. A specific embodiment of the CMTS 601 is described in greater detail below with respect to FIGS. 6 and 7.

As show in FIG. 6, the cable network 600 includes two different types of fiber nodes, namely RF fiber nodes (e.g. 606), and fiber nodes (e.g., 620a and 620b). According to a specific embodiment, the RF fiber node 606 may be configured as a conventional fiber node such as fiber nodes 106 of FIG. 1. According to a specific implementation, the RF fiber node 606 may be configured to handle all legacy RF downstream and upstream communications (such as, for example, set-top box signals, telemetry signals, etc., and communications that occur on centralized DOCSIS channels), and may be configured to perform additional functions associated with conventional fiber nodes.

As shown in the embodiment of FIG. 6, a baseband fiber network 616 may be deployed that is coupled to the conventional cable network. The baseband fiber network may include a plurality of fiber nodes 620, which are also coupled to the conventional fiber network. Each fiber node may be inserted into the cable network 600 using a combiner and/or splitter that may be used to add and/or separate DOCSIS signals into/from the RF lineup.

Communication between the head end complex 602 and the plurality of fiber nodes 620 may be accomplished via the baseband fiber network 616. For example, according to a specific implementation, one or more IP tunnels may be formed between the head end complex 602 and the plurality of fiber nodes 620 in order to allow for transmission and reception of IP packets. In a specific implementation, the IP tunnel(s) may be formed between the CMTS 601 and one or more DCMTS devices 626a, 626b (residing at one or more fiber nodes). The CMTS 601 may be configured to handle layer 3 functionality, including packet-related decisions, network layer decisions, IP related decisions, etc. Additionally, according to a specific implementation, the CMTS may also be responsible for handing redundancy and/or failover functionality for selected DCMTS devices.

According to specific embodiments of the present invention, each fiber node may include a distributed CMTS device (herein referred to as a "DCMTS"), which is configured to receive and transmit baseband optical signals from/to the head end complex 602 via baseband fiber network 616. According to a specific implementation, the DCMTS may be configured to perform conversions between packet protocols implemented over the baseband fiber media (e.g., 611 and 613) and DOCSIS protocols implemented on the coax media (e.g. 609a and 609b). According to a specific embodiment, the functionality of the DCMTS may include all or a selected portion of the functionality provided by a conventional CMTS device. For example, the DCMTS may perform, at a relatively local level, at least a portion of the scheduling or MAC functions typically performed by conventional CMTS devices residing at the head end complex. Additionally, the DCMTS may be configured to handle layer 1 and layer 2 functionality such as the OSI layer management (e.g. physical layer, RF layer, hardware), MAC layer management, data link layer management, framing functionality, DOCSIS protocol functionality, timestamp functionality, etc.

According to a specific implementations of the present invention, the fiber nodes may be pushed deeper into the network (i.e. closer to the subscriber groups) than conventional RF fiber nodes, which, as illustrated in FIG. 6, may result in a plurality of fiber nodes 620 servicing subscriber groups (e.g. 610a and 610b) which are serviced by a single RF fiber node 606. For example, the RF fiber node 606 may be configured to service 600 households past (HHP) while each fiber node may be configured to service 100 households past, resulting in 2 fiber nodes (620a and 620b) servicing the 600 households that are serviced by the RF fiber node 606.

In addition to being configured to receive baseband optical signals, the fiber nodes 620 may also be configured to receive electrical signals from the RF fiber nodes via coax lines (e.g. 607A and 607B). Such electrical signals may include, for example, clock or other timing reference signals and/or timestamp synchronization signals.

FIG. 7 shows an alternate embodiment of a cable network 750, which may be used for implementing the methods of the present invention. In the cable network of FIG. 7, the centralized CMTS typically residing at the head end complex 752 has been removed, and its functionality incorporated into selected DCMTS devices (e.g. 726a, 726b) residing in the fiber nodes 725. Thus, according to the embodiment of FIG. 7, selected DCMTS devices residing in the fiber nodes 725 may be configured to implement the functions typically implemented by the centralized CMTS device, such as, for example, layer 3 functionality and/or at least a portion of the functionality performed by the various logic described with respect to FIGS. 4 and 5 of the drawings.

According to a specific embodiment, communication of IP packets between the head end complex 752 and the plurality of fiber nodes 755 may be accomplished without the use of a tunneling protocol. In such an embodiment, communication between network devices may be accomplished using, for example, a standardized IP protocol. Additionally, as shown in the embodiment of FIG. 7, the head end complex 752 may include a switch 754 (e.g., an Ethernet switch), or other type of traffic handling device that may be configured to route or forward traffic between network devices in the cable network 750, or between the devices in the cable network and devices in external networks. Further, as shown in the example of FIG. 7, the head end complex may also include a DCMTS Synchronization Module 755, which may be configured to provide synchronized clock reference signals and/or synchronized timestamp information to the plurality of fiber nodes 725.

While the discussion to this point has focused on techniques for cable networks, the technology of the present invention may be applied to any access or shared-access network having a plurality of hosts or nodes that share at least one channel for communicating with at least one "head end" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic handling device (e.g., a switch or router) for providing control capabilities in a network having at least one traffic handling device (e.g., another switch or router) that provides normal service to a host. In a wireless system (e.g., as represented by FIG. 8) the plurality of nodes or hosts corresponds to the plurality of wireless nodes 850, which use at least one shared access channel to communicate with at least one access control system 822 located at the head end of the wireless system.

Figure 8:
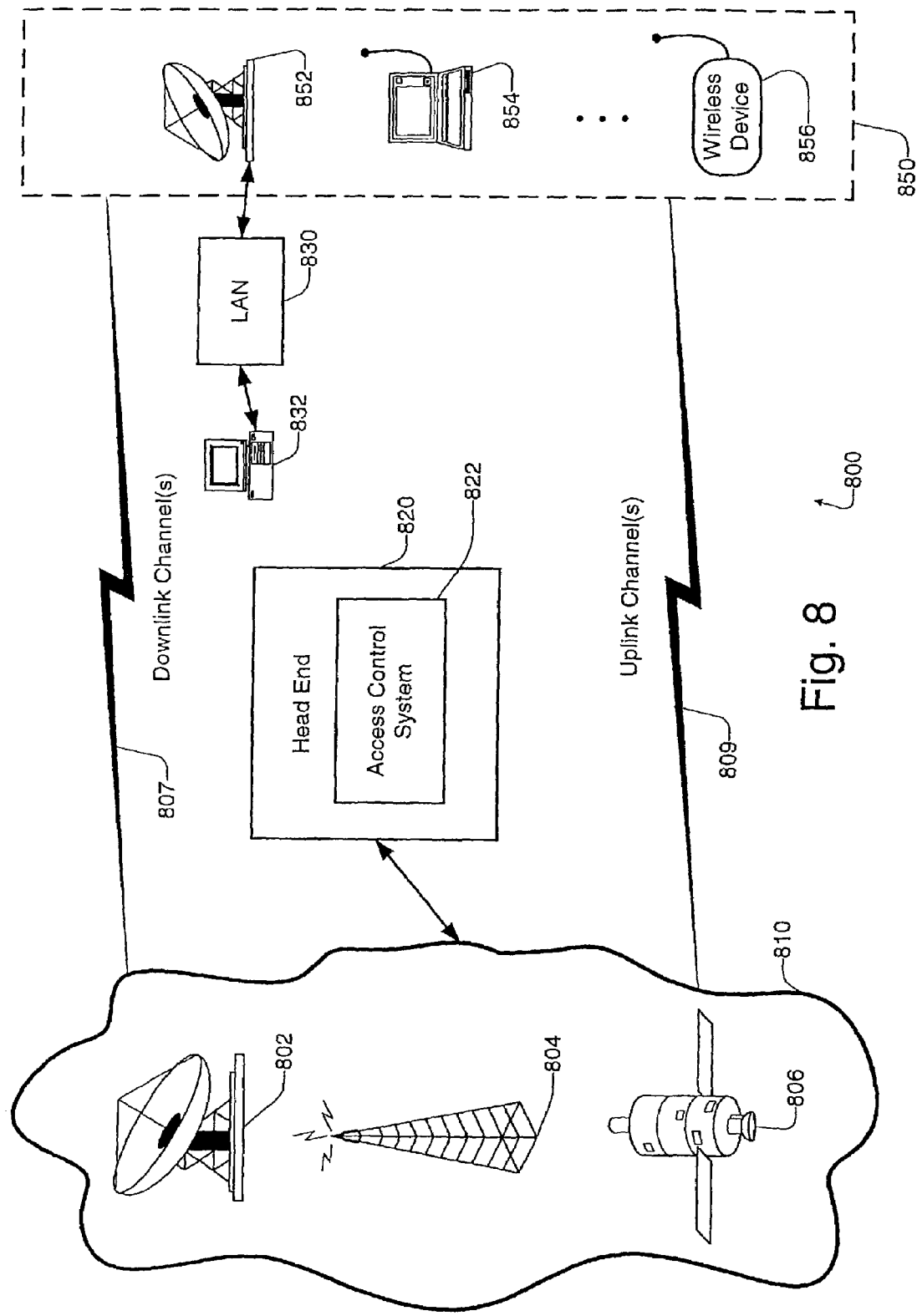
FIG. 8 is a block diagram that illustrates a network having wireless uplink and downlink channels.

FIG. 8 shows an example of a wireless data communication system 800, which may be used for implementing the technique of the present invention. As shown in FIG. 8, the wireless system includes a central termination system (or head end) 820. The head end includes an access controller or access control system (ACS) 822 that communicates with a plurality of wireless nodes 850, and coordinates access between each of the wireless nodes and the head end 820. The access controller 822 may include memory and at least one processor. In a specific embodiment, the function of the access controller 822 is analogous to that of the CMTS described above with respect to cable modem networks. It may serve as a router or switch as well.

The head end 820 communicates with a plurality of wireless nodes 850 via any one of a plurality of wireless transmitting and receiving devices 810. As shown in FIG. 8, for example, the plurality of wireless transmitting and receiving devices 810 may include satellite base stations 802, orbital satellites 806, radio towers 804, etc.

In a specific embodiment that is analogous to that of cable modem networks, the head end 820 of the wireless computer system communicates with the plurality of nodes 850 via one or more downlink channels 807 and one or more uplink channels 809. Each downlink channel 807 is a broadcast-type channel utilized by the head end to communicate with an associated group of wireless nodes within the wireless network. The uplink channel 809 is a shared-access channel, which is utilized by a group of wireless nodes (analogous to cable modems) to communicate with the head end 820. The access controller 822 stores registration parameters for the various nodes that it services. It may also store the IP addresses for nodes that it services.

In a specific embodiment of the present invention, the registration process and information is similar to that of the cable network CMTSs described above. Moreover, the techniques of the present invention for detecting and/or preventing unauthorized quality of service upgrades may be implemented in wireless system 800.

The wireless devices or nodes 850 may include any one of a number of wireless transmitting/receiving devices. For example, a satellite dish 852 may be used to communicate with the head end 820 via the uplink and downlink channels. The satellite dish may, in turn, be connected to a local area network (LAN) 830, which may be further connected to one or more computer systems 832. Another wireless device may be a portable/wireless computer system 854, which is able to transmit and receive information to the head end via uplink and downlink channels 807 and 809. Other wireless devices 856 may include, for example, wireless telephones, handheld computing devices, etc.

In specific embodiments where the uplink and downlink channels within the wireless system 800 are utilized in a manner similar to that of the upstream and downstream channels of a cable modem network, the above-described techniques may easily be implemented in wireless system 800 using the detailed description of the present invention provided herein. Moreover, the techniques of the present invention may be easily implemented in any computer network that uses shared access channels for communicating between a centralized computing system and one or more remote nodes.

While the invention has been particularly shown and described with reference to specific embodiments thereof, it will be understood by those skilled in the art that changes in the form and details of the disclosed embodiments may be made without departing from the spirit or scope of the invention. For example, it will be appreciated that the methods of the present invention are not limited to cable networks and may be applied to any access data network that uses at least one shared access communication channel to communicate between a plurality of nodes in the network and a terminal to which the plurality of nodes is connected. Therefore, the scope of the invention should be determined with reference to the appended claims.

We claim:

1. A method of controlling nodes in an access network, the access network including a Head End, the access network further including a plurality of upstream and downstream channels for providing communication between nodes and the Head End of the access network, the method comprising:

receiving a log-in request from a first node;

sending information to the first node for enabling the first node to download a specified configuration file from a trusted server;

monitoring communications associated with the first node in order to determine whether the first node downloads the specified configuration file from the trusted server;

performing at least one action in response to the login request, wherein the at least one action is based at least in part on a determination that the first node has not downloaded the specified configuration file from the trusted server;

determining whether a communication was sent from the first node to a destination address associated with the trusted server; and determining whether the communication includes a request for accessing the specified configuration file.

2. The method of claim 1 further comprising:

determining, using the monitored communications associated with the first node, whether the first node has downloaded the specified configuration file from the trusted server.

3. The method of claim 1 further comprising:

monitoring communications associated with the first node in order to determine whether the first node has communicated with the trusted server.

4. The method of claim 1:

wherein the log-in request is received at a first entity; and wherein said determining is performed by the first entity.

5. The method of claim 1:

wherein the log-in request is received at the Head End; and wherein said determining is performed at the Head End.

6. The method of claim 1, wherein the at least one action includes:

marking a file associated with the first node in response to a determination that the first node has not downloaded the specified configuration file from the trusted server.

7. The method of claim 1, wherein the at least one action includes:

marking a file associated with the first node in response to a determination that the first node has not downloaded the specified configuration file from the trusted server;

wherein the marking comprises adding a symbol to a predetermined field of the file associated with the first node.

8. The method of claim 1, wherein the at least one action includes:

marking a file associated with the first node in response to a determination that the first node has not downloaded the specified configuration file from the trusted server; and associating a marked node with a plurality of marked nodes.

9. The method of claim 1, wherein the at least one action includes:

denying the log-in request in response to a determination that the first node has not downloaded the specified configuration file from the trusted server.

10. The method of claim 1 wherein the at least one action includes:

adding marking information to a description of the first node in response to a determination that the first node has not downloaded the specified configuration file from the trusted server.

11. The method of claim 1 further comprising:

monitoring communications from the first node; and determining whether the first node has communicated with the trusted server.

12. The method of claim 1 wherein the specified configuration file has associated therewith a specified configuration file name, the method further comprising:
monitoring communications from the first node; and
determining whether the first node has sent a request to the trusted server for accessing the specified configuration file.

13. The method of claim 1, wherein the first node comprises a cable node and wherein specified configuration file comprises a DOCSIS configuration file.

14. The method of claim 1, wherein the at least one action includes:
monitoring the first node in response to a determination that the first node has not downloaded the specified configuration file from the busted server.

15. A method of controlling nodes in an access network, the access network including a Head End, the access network further including a plurality of upstream and downstream channels for providing communication between nodes and the Head End of the access network, the method comprising:
receiving a log-in request from a first node;
sending information to the first node for enabling the first node to download a specified configuration file from a trusted server;
monitoring communications associated with the first node in order to determine whether the first node downloads the specified configuration file from the trusted server;
performing at least one action in response to the log-in request, wherein the at least one action is based at least in part on a determination that the first node has not downloaded the specified configuration file from the trusted server; and
increasing a service charge to a customer associated with the first node in response to a determination the first node has not downloaded the specified configuration file from the trusted server.

16. The method of claim 1, wherein the at least one action includes:
sending a warning message to the first node in response to a determination that the first node has not downloaded the specified configuration file from the trusted server.

17. A cable modem termination system for controlling nodes in an access network, the access network including a Head End, the access network further including a plurality of upstream and downstream channels for providing communication between nodes and the Head End of the access network, the cable modem termination system comprising:
at least one processor;
at least one interface configured or designed to provide a communication link to at least one other network device in the data network; and
memory;
the cable modem termination system being operable to:
receive a log-in request from a first node;
send information to the first node for enabling the first node to download a specified configuration file from a trusted server;
monitor communications associated with the first node in order to determine whether the first node downloads the specified configuration file from the trusted server;
perform at least one action in response to the log-in request, wherein the at least one action is based at least in part on a determination that the first node has not downloaded the specified configuration file from the trusted server;

determine whether a communication was sent from the first node to a destination address associated with the trusted server; and
determine whether the communication includes a request for accessing the specified configuration file.

18. The cable modem termination system of claim 17 being further operable to:
determine, using the monitored communications associated with the first node, whether the first node has downloaded the specified configuration file from the trusted server.

19. The cable modem termination system of claim 17 being further operable to:
monitor communications associated with the first node in order to determine whether the first node has communicated with the trusted server.

20. The cable modem termination system of claim 17:
wherein the log-in request is received at a first entity; and
wherein said determining is performed by the first entity.

21. The cable modem termination system of claim 17:
wherein the log-in request is received at the Head End; and
wherein said determining is performed at the Head End.

22. The cable modem termination system of claim 17, being further operable to:
mark a file associated with the first node in response to a determination that the first node has not downloaded the specified configuration file from the trusted server.

23. The cable modem termination system of claim 17, being further operable to:
mark a file associated with the first node in response to a determination that the first node has not downloaded the specified configuration file from the trusted server;
wherein the mark comprises adding a symbol to a predetermined field of the file associated with the first node.

24. The cable modem termination system of claim 17, being further operable to:
mark a file associated with the first node in response to a determination that the first node has not downloaded the specified configuration file from the trusted server; and
associate a marked node with a plurality of marked nodes.

25. The cable modem termination system of claim 17, being further operable to:
deny the log-in request in response to a determination that the first node has not downloaded the specified configuration file from the trusted server.

26. The cable modem termination system of claim 17 being further operable to:
add mark information to a description of the first node in response to a determination that the first node has not downloaded the specified configuration file from the trusted server.

27. The cable modem termination system of claim 17 being further operable to:
monitor communications from the first node; and
determine whether the first node has communicated with the trusted server.

28. The cable modem termination system of claim 17 wherein the specified configuration file has associated therewith a specified configuration file name, the cable modem termination system being further operable to:
monitor communications from the first node; and
determine whether the first node has sent a request to the trusted server for accessing the specified configuration file.

29. The cable modem termination system of claim 17, wherein the first node comprises a cable node and wherein the specified configuration file comprises a DOCSIS configuration file.

30. The cable modem termination system of claim 17, being further operable to:
monitor the first node in response to a determination that the first node has not downloaded the specified configuration file from the trusted server.

31. A cable modem termination system for controlling nodes in an access network, the access network including a Head End, the access network further including a plurality of upstream and downstream channels for providing communication between nodes and the Head End of the access network, the cable modem termination system comprising:
at least one processor;
at least one interface configured or designed to provide a communication link to at least one other network device in the data network; and
memory;
the cable modem termination system being operable to:
receive a log-in request from a first node;
send information to the first node for enabling the first node to download a specified configuration file from a trusted server;
monitor communications associated with the first node in order to determine whether the first node downloads the specified configuration file from the trusted server;
perform at least one action in response to the log-in request, wherein the at least one action is based at least in part on a determination that the first node has not downloaded the specified configuration file from the trusted server; and
increase a service charge to a customer associated with the first node in response to a determination that the first node has not downloaded the specified configuration file from the trusted server.

32. The cable modem termination system of claim 17, being further operable to:
send a warning message to the first node in response to a determination that the first node has not downloaded the specified configuration file from the trusted server.

33. A system for controlling nodes in an access network, the access network including a Head End, the access network further including a plurality of upstream and downstream channels for providing communication between nodes and the Head End of the access network, the system comprising:
means for receiving a log-in request from a first node;
means for sending information to the first node for enabling the first node to download a specified configuration file from a trusted server;
means for monitoring communications associated with the first node in order to determine whether the first node downloads the specified configuration file from the trusted server; and
means for performing at least one action in response to the log-in request wherein the at least one action is based at least in part on a determination that the first node has not downloaded the specified configuration file from the trusted server, wherein the performing means is operable for performing at least one action selected from a group consisting of:
(a) denying the log-in request in response to a determination that the first node has not downloaded the specified configuration file from the trusted server;
(b) marking a file associated with the first node in response to a determination that the first node has not downloaded the specified configuration file from the trusted server;
(c) adding marking information to a description of the first node in response to a determination that the first node has not downloaded the specified configuration file from the trusted server; and
(d) increasing a service charge to a customer associated with the first node in response to a determination that the first node has not downloaded the specified configuration file from the trusted server.

* * * * *